UNITED STATES PATENT OFFICE.

JOSIAH K. LILLY, OF INDIANAPOLIS, INDIANA, ASSIGNOR TO ELI LILLY & COMPANY, OF INDIANAPOLIS, INDIANA, A CORPORATION OF INDIANA.

COMPOSITION FOR THE PRODUCTION OF FERROUS CARBONATE.

No. 876,366.        Specification of Letters Patent.        Patented Jan. 14, 1908.

Application filed September 1, 1906. Serial No. 333,026. (Specimens.)

*To all whom it may concern:*

Be it known that I, JOSIAH K. LILLY, a citizen of the United States, residing at Indianapolis, in the county of Marion and State of Indiana, have invented certain new and useful Improvements in Composition for the Production of Ferrous Carbonate, of which the following is a specification.

The object of my invention is to produce in liquid form a mixture or solution which will remain practically permanently in condition to readily produce ferrous carbonate for introduction into the human system. Attempts have heretofore been made to this end but difficulty has been experienced in preventing the oxidation of the ferrous iron.

I have discovered that by suspending or dissolving a ferrous salt, as for instance ferrous sulfate, in a liquid carrier which will protect it from oxidation and by associating with this mixture or solution a carbonate, or substance capable of furnishing the $CO_3$ group at the moment of use, a solution or mixture may be obtained which may be kept for a considerable period with only slight oxidation of the ferrous iron. It is preferable that the liquid carrier be soluble in water, to facilitate introduction into the system, and I deem it advisable to use a carrier of this kind which is practically inert therapeutically, such a substance for instance as glycerin.

In producing the compound I find the following method advisable. A ferrous salt, such for instance as ferrous sulfate, is dissolved in glycerin; to this mixture is added a carbonate, preferably sodium carbonate, or potassium carbonate, being careful not to introduce an excess of the carbonate. If desired the carbonate may first be dissolved in glycerin and this mixture added to the glycerin solution of the ferrous salt. If desired a hydroxid, such for instance as sodium or potassium hydroxid, may be used instead of the carbonate and the mixture then carbonated with carbon dioxid.

In practice I have found that, for producing the medicine in commercial quantities, the following formula has been satisfactory. 1. In 11 gallons pure glycerin, dissolve by aid of gentle heat, 3 pounds, 4 ounces, 292 grains pure ferrous sulfate. 2. In 4 gallons pure glycerin, dissolve by aid of gentle heat, 1 pound, 10 ounces, 90 grains pure potassium carbonate. 3. When cool, place solution (1) in an earthenware vessel of sufficient capacity and add slowly, with stirring, solution (2). When thoroughly mixed, pour sufficient pure mineral oil to cover the surface in order to protect from oxygen and moisture in air. It is now ready to be drawn off below into bottles. This produces about 15 gallons.

If desired, mannite may be substituted for glycerin as it possesses substantially the same qualities, with respect to ferrous salts and any desirable carbonate, as gylcerin although it is a soft solid at ordinary temperatures and, if a liquid mixture is desired, it will be advisable to mix a small proportion of glycerin with the mannite.

I claim as my invention.

1. A composition consisting of a stable solution of a ferrous salt and an alkaline carbonate in a neutral liquid miscible with water and forming a protection against oxidation of the ferrous salt, substantially as described.

2. A composition consisting of a stable solution of ferrous sulfate and potassium carbonate in a neutral liquid miscible with water and forming a protection against oxidation of the ferrous sulfate, substantially as described.

3. A liquid composition consisting of a stable solution of a ferrous salt and an alkaline carbonate in glycerin.

4. A liquid composition consisting of a stable solution of a ferrous salt and potassium carbonate in glycerin.

5. A liquid composition consisting of a stable solution of ferrous sulfate and an alkaline carbonate in glycerin.

6. A liquid composition consisting of a stable solution of ferrous sulfate and potassium carbonate in glycerin.

In witness whereof, I, have hereunto set my hand and seal at Indianapolis, Indiana, this 30th day of August, A. D. one thousand nine hundred and six.

JOSIAH K. LILLY. [L. S.]

Witnesses:
     ARTHUR M. HOOD,
     THOMAS W. McMEANS.